United States Patent
Sahay

(10) Patent No.: US 9,286,447 B2
(45) Date of Patent: Mar. 15, 2016

(54) PORTABLE DIGITAL VAULT AND LENDING OF SAME

(71) Applicant: Infosys Limited, Bangalore (IN)

(72) Inventor: Pankaj Sahay, Thane (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/184,236

(22) Filed: Feb. 19, 2014

(65) Prior Publication Data

US 2014/0289516 A1    Sep. 25, 2014

(30) Foreign Application Priority Data

Mar. 20, 2013  (IN) .......................... 1202/CHE/2013

(51) Int. Cl.
| | |
|---|---|
| *G06F 21/10* | (2013.01) |
| *H04L 9/32* | (2006.01) |
| *G06F 21/12* | (2013.01) |
| *H04L 29/06* | (2006.01) |

(52) U.S. Cl.
CPC .............. *G06F 21/10* (2013.01); *G06F 21/121* (2013.01); *H04L 9/3263* (2013.01); *H04L 63/0823* (2013.01); *G06F 2221/2141* (2013.01); *H04L 63/0442* (2013.01); *H04L 63/107* (2013.01); *H04L 63/108* (2013.01); *H04L 2209/603* (2013.01)

(58) Field of Classification Search
CPC .... G06F 21/10; G06F 21/121; H04L 63/0442
See application file for complete search history.

(56) References Cited

U.S. PATENT DOCUMENTS

| | | | |
|---|---|---|---|
| 7,136,945 B2 | 11/2006 | Gibbs et al. | |
| 7,298,851 B1 | 11/2007 | Hendricks et al. | |
| 7,523,072 B2 | 4/2009 | Stefik et al. | |
| 7,644,265 B2 | 1/2010 | Kudo et al. | |
| 7,647,276 B2 | 1/2010 | Lutnick et al. | |
| 7,734,047 B2 | 6/2010 | Nakayama et al. | |
| 2002/0013772 A1* | 1/2002 | Peinado .......................... | 705/51 |
| 2003/0004885 A1* | 1/2003 | Banerjee et al. ................ | 705/52 |
| 2003/0046274 A1* | 3/2003 | Erickson ........... | G06F 17/30017 |

(Continued)

FOREIGN PATENT DOCUMENTS

EP    1139197    10/2001

OTHER PUBLICATIONS

E. Diehl, et al. "An Introduction to Interoperable Digital Rights Locker," DRM'10, Oct. 4, 2010, pp. 51-54.*
"Amazon Kindle 2, International Review," *The eBook Reader*, 4 pages (document not dated, downloaded on Jun. 15, 2011).

(Continued)

*Primary Examiner* — Robert Leung
(74) *Attorney, Agent, or Firm* — Klarquist Sparkman, LLP

(57) ABSTRACT

A portable digital vault and related methods are disclosed that can provide a digital equivalent to the physical act of lending copyrighted content (such as a book or CD) while also providing security to prevent copying of the content. The vault acts as a self-contained authority that contains permissions relating to actions that can be taken with respect to the vault and vault contents. Vault contents can be moved between vaults, vaults can be moved between computing devices, and a vault and its contents can be moved together as a single unit. A vault can store any type of content, such as digital books, audio and video. In some embodiments, the vault can be issued by a government authority and contain currency note information that allows the vault to be used as cash. A vault can also serve as a receipt of a digital legal contract.

12 Claims, 7 Drawing Sheets

(56) References Cited

U.S. PATENT DOCUMENTS

| | | | |
|---|---|---|---|
| 2005/0084100 A1* | 4/2005 | Spies et al. .................... 380/30 |
| 2007/0079381 A1* | 4/2007 | Hartung et al. ................ 726/26 |
| 2008/0025507 A1* | 1/2008 | Taylor .................... G06F 21/10 380/201 |
| 2012/0239758 A1* | 9/2012 | Dzmitrenka et al. ......... 709/206 |
| 2012/0254304 A1* | 10/2012 | Anbalagan et al. ........... 709/204 |
| 2013/0030941 A1* | 1/2013 | Meredith et al. ............. 705/26.3 |
| 2014/0041045 A1* | 2/2014 | McConnell ............ G06F 21/10 726/27 |
| 2014/0052558 A1* | 2/2014 | Rogel et al. ................. 705/26.1 |

OTHER PUBLICATIONS

"Deontic logic," downloaded from *Wikipedia*, 5 pages (document not dated, downloaded on Jun. 14, 2011).

T. Okamoto and K. Ohta, "Universal Electronic Cash," in *Advances in Cryptology—Crypto '91* (*Lecture Notes in Computer Science*), vol. 576, pp. 324-337 (Mar. 1992).

Lee et al., "Securing Uniqueness of Rights e-Documents: A Deontic Process Perspective," *Journal of Theoretical and Applied Electronic Commerce Research*; ISSN 0718-1876 Electronic Version; vol. 3, Issue 3, pp. 83-102 (Dec. 2008).

\* cited by examiner

PORTABLE DIGITAL VAULT AND LENDING OF SAME

BACKGROUND

One right in the bundle of copyrights is the exclusive right of a copyright owner to control copying of his or her copyrighted work. For example, the author of a book can grant a publisher the right to print 1,000 copies of the book. Purchasers of the book can dispose of their copy as they please; a library can loan its copy of the book to its patrons, and an individual purchaser can sell his or her copy to a friend. However, the library and the individual are prevented from making additional copies of the book without the author's permission.

Copyright protection extends to the digital realm, where copyright owners suffer considerable economic losses due to digital piracy. Digital rights management (DRM) technologies have been developed to counter unauthorized digital copying, but DRM policies can prevent people from performing legal activities, such as creating backup copies of CDs or DVDs or using copyrighted materials for education and research under fair use laws.

Physical documentation that commemorates transactions and agreement, such as contracts, bills and receipts have also found their way into the digital realm. With the increasing pervasiveness of e-commerce, more and more transactions are being made for which only electronic records of the transaction exist.

SUMMARY

This Summary is provided to introduce a selection of concepts in a simplified form that are further described below in the detailed description. This Summary is not intended to identify key features or essential features of the claimed subject matter, nor is it intended to be used to limit the scope of the claimed subject matter.

A portable digital vault and vault transfer protocols are described that allow a vault owner to lend the vault or its contents in a secure manner, such that unauthorized copies are not created. Thus, the technologies described herein provide a digital analog of lending a physical work of copyrighted material, such as a printed book, CD or DVD.

In one embodiment, a portable digital vault comprises a plurality of modules responsible for carrying out various vault-related tasks. A vault can include a content module that stores encrypted digital content, a rendering module that displays vault contents on an authorized computing device, a rights module that stores information relating to vault permissions, a key management module that generates physical keys used to encrypt vault content, a transfer module responsible for tasks related to the transfer of vaults and vault contents and an identity module that comprises a vault certificate that comprises a validity test condition specifying a computing device identifier.

In one embodiment of transferring digital content between vaults, a lender's device receives the physical address (such as a hashed Media Access Control (MAC) address) of a borrower's device and a physical key associated with the borrower, the person borrowing the content. The lender's device decrypts the content stored in the lender device's vault, encrypts the content using the borrower's physical key, and sends the encrypted content to the borrower's device for storage within a vault located at the borrower's device. The lender's device sends authorization keys mapped to the borrower's device to grant the borrower permissions with respect to the vault and the vault content. These permissions can be set by the lender or the authority that originally issued the content, and may be further configured by the borrower.

The foregoing and other objects, features, and advantages of the invention will become more apparent from the following detailed description, which proceeds with reference to the accompanying figures.

DETAILED DESCRIPTION

Example 1

Exemplary Portable Digital Vault

Figure 1:
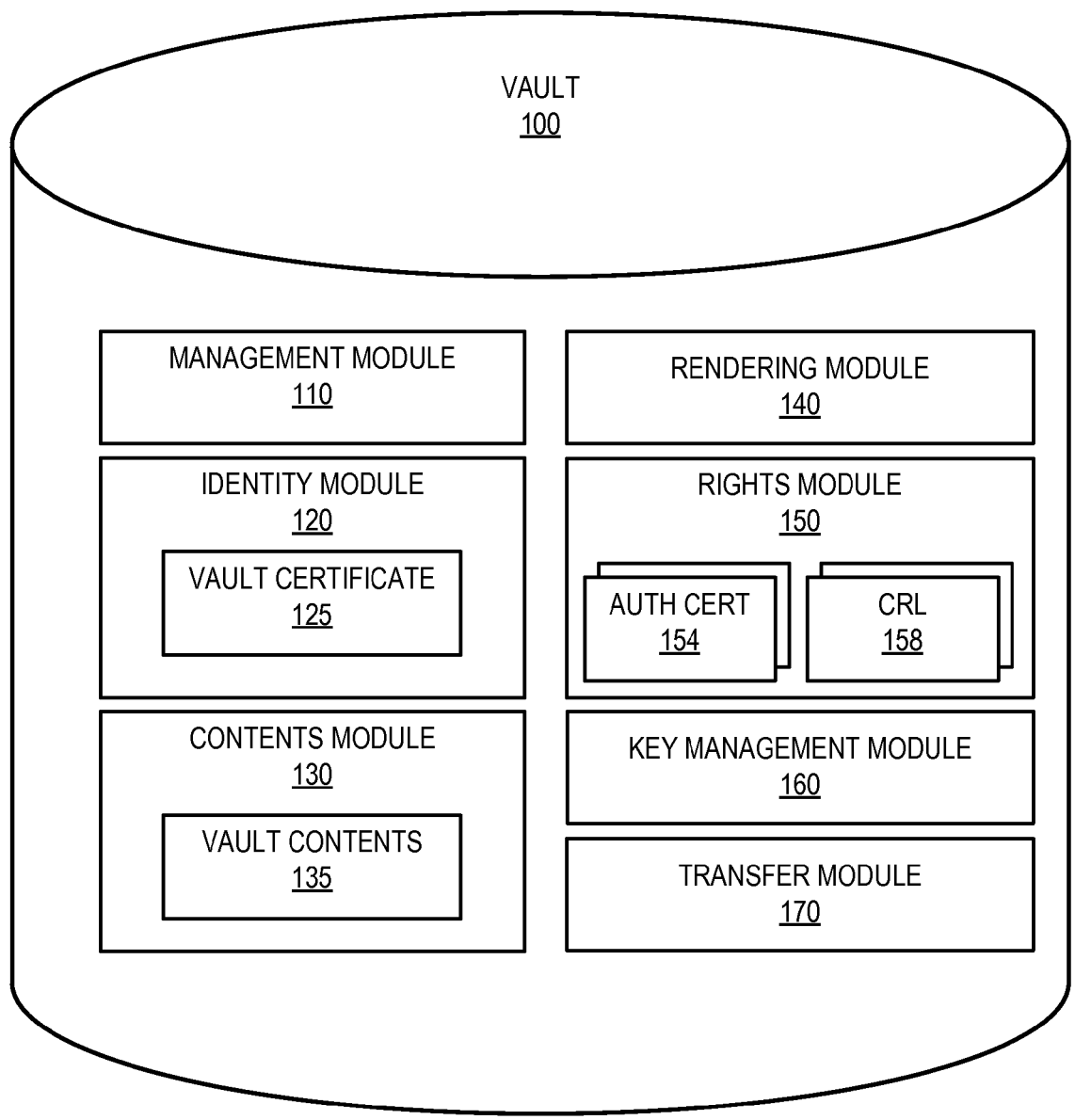
FIG. 1 is a block diagram of a portable digital vault.

FIG. 1 is a block diagram of a portable digital vault 100 (vault) that provides for the secure storage of digital content and allows a vault owner to lend the digital content to another person. The vault 100 comprises computer-executable instructions that can be stored at and executed by any of the computing devices described herein. The vault 100 comprises a management module 110, an identity module 120, a contents module 130, a rendering module 140, a rights module 150, a key management module 160 and a transfer module 170.

The management module 110 manages operations performed by other modules within the vault.

The identity module 120 comprises a vault ID (VID) and a vault certificate 125. The VID can uniquely identify a vault, and in some embodiments, the VID can be a collision-free hash of a public key associated with the vault owner. In various embodiments, the VID can be a fully qualified SDSI (Simple Distributed Security Infrastructure) name, (a vault owner's public key plus one or more names within the name space of a particular issuing authority associated with the public key).

The vault certificate 125 is a certificate that identifies the issuing authority that issued the vault. Thus, the vault certificate 125 provides a vault owner with the ability to certify that the issuing authority indicated in the vault certificate issued the vault. In some embodiments, the vault certificate 125 comprises one or more validity test conditions to be satisfied before a vault owner can access the vault, that is, to execute vault modules and access the vault contents. In some embodiments, a vault certificate 125 can comprise a validity test condition that requires the computing device at which the vault is located to have a specified computing device identifier, such as a physical address (e.g., a MAC (Media Access Control) address). For example, in some embodiments, at least the contents module 130, the transfer module 170 and the rendering module 140 can only be executed on a computing device associated with a computing device identifier that matches a computing device identifier specified in a test validity condition.

Certain vault modules (or portions thereof) can be executable on a computing device even though validity conditions are not met. For example, the management module 110 and the identity module 120 can be executable by a user to determine whether the vault is stored on a computing device on which access to the vault contents is allowed, regardless of the computing device on which the vault is stored.

The contents module 130 comprises digital vault content 135 (vault content). The vault content 135 can be electronic or digital books (e-books), images, audio, video, bills, receipts, tickets, bills of lading, property documents, agreements, contracts, currency notes or any other information. Typically, the vault content is encrypted within the vault. The vault content can be encrypted in a manner that allows the content to be decrypted by a computing device having access to the public key associated with the private key used to encrypt the data. In some embodiments, the contents can be digitally watermarked for various purposes, such as tracking.

The rendering module 140 is configured to output the vault contents at an output (e.g., speaker, display) of the computing device on which the vault is stored, or at an output connected to the computing device. Accordingly, the rendering module 140 can comprise, for example, an e-book reader, a media player or other software capable of outputting digital content. In some embodiments, the rendering module 140 is configured to provide a secure interface to software external to the vault that can output content at a computing device, such as a word processing application. The secure interface prevents the standard software application from making copies of the vault contents.

The rights module 150 comprises one or more authorization certificates 154 (or other information) indicating rights or permission (rights) relating to the vault or the vault contents, such as the right to access vault contents. The right to access vault contents generally means the right to have vault contents output at a computing device in unencrypted form.

A right can be a delegable right or a non-delegable right. A non-delegable right corresponds to or is mapped to a single user. A vault does not allow a non-delegable right to be delegated to another user. One example of a non-delegable right is ownership of a digital book; regardless of who possesses the vault containing the book (e.g., a borrower of the book), the ownership right reflected by the information in the rights module 150 remains with the owner. A delegable right is a right that a vault owner can delegate to another user (e.g., a subsequent vault owner). One example of a delegable right is ownership of transferable ticket.

In some embodiments, whether a right is delegable and control over delegable rights can be implemented by Boolean flags associated with an authorization certificate. For example, a DELEGABLE flag can indicate whether an authorization certificate is associated with a delegable right. If the DELEGABLE flag associated is set to TRUE, the vault owner can delegate the right to another user. If the DELEGABLE flag is set to FALSE, the vault owner cannot delegate the right to another user. Delegation control can also be a delegable right. A DELEGABLE_CONTROL can indicate whether a recipient of a vault is allowed to further delegate a right. If DELEGABLE_CONTROL is set to TRUE, a subsequent vault owner can delegate the right; if DELEGABLE_CONTROL is set to FALSE, the subsequent vault will not be able to use the right.

Alternative delegation schemes can be implemented in the rights module 150. For example, a rights module can be configured to allow a right to be delegated only to users within a specified pool of users (identified by public key, user ID, computing machine identifier (e.g., MAC address or other physical address) or other information). The pool of users can be designated by the issuing authority, the current vault owner or a previous vault owner. An order in which the vault or contents are to be distributed among the pool users can be specified as well.

Time, date and geographical constraints can also be associated with delegable rights. For example, a right can be configured to be delegable for a certain amount of time after the vault (or its contents) has been transferred, after which time the delegable right converts to a non-delegable right. A geographic constraint can limit delegation to other devices located within a specified geographic range, limit the geographic range in which a vault may be transferred or limit the geographic range in which transferred content may be used. In some embodiments, the delegation of rights associated with an authorization certificate can be implemented in accordance with delegation approaches described in the Internet Engineering Task Force (IETF) Request For Comments (RFC) 2693 SPKI (Simple Public Key Infrastructure) Certificate Theory memorandum.

In some embodiments, the rights module 150 further comprises one or more Certificate Revocation Lists (CRLs) 158. A CRL 158 can be used to track changes in ownership of a delegable right by, for example, monitoring changes in authentication certificates (e.g., monitoring the revocation of authentication certificates as a vault (or its contents) is transferred).

The key management module 160 is responsible for executing and managing various PKI (Public Key Infrastructure)/SPKI (Simple Public Key Infrastructure) functions such as certificate validation, authorization and rights delegation.

The transfer module 170 is responsible for tasks relating to the transfer of a vault from one computing device to another, or for transferring vault contents between vaults. In some embodiments, transfer of a vault or its contents involves binding the vault or vault contents to be transferred to a physical address of the computing device to receive the vault.

Example 2

Exemplary Vault Owner

As used herein, the term "vault owner" means the user to whom the vault is bound. A vault can be bound to a user via the VID if the VID is a user's physical key (or transform thereof), the encryption of the vault content if a user's physical key was used to encrypt the contents, or in another manner. Typically, the vault owner is the owner or a user of the computing device on which the vault is located.

Example 3

Exemplary Digital Content and Rights

In any of the examples described herein, a portable digital vault can comprise any type of content and grant vault owners and others with rights to the vault and its content.

For example, vault content can comprise an e-book. The issuing authority of a vault containing an e-book can be, for example, an online book retailer.

Ownership of the e-book lies with the book purchaser, but anyone in possession of the e-book (i.e., anyone in possession of the computing device on which the vault containing the e-book is stored) can read the book. The rights module for a vault containing an e-book can comprise an ownership authentication certificate that identifies the owner of the e-book. The ownership authentication certificate can be bound or mapped to an initial book purchaser (i.e., the user that purchased the book from the issuing authority) or a subsequent purchaser who purchased the e-book from the initial purchaser. The issuing authority can configure the rights module such that the ownership authentication certificate is associated with a delegable or non-delegable ownership right. The ownership right can be designated as non-delegable if the digital book was purchased as a non-transferable book, and the ownership right can be delegable if the digital book was purchased as transferable content.

The rights module can further comprise an access authentication certification associated with a right to access the book contents. Typically, an access right is a delegable right. That is, a vault owner can transfer the vault to a person to whom the owner wishes to lend the e-book. An access authentication certificate can have an associated delegation control authorization certificate that enables the owner of the book to control whether a borrower can lend out the e-book to someone else. In some embodiments, the book owner (or any user of an ownership right reflected by an ownership authorization certificate) can set conditions on delegation. For example, an owner can set a limit of the number of borrowers in a chain of borrowers, who a borrower can lend the e-book to, how long a borrower can remain the vault owner (which can be designated in terms of real time or time spent viewing the vault content), and the like.

In some instances, a vault can be configured such that the vault is automatically returned to an entity (e.g., the owner identified in an ownership authorization certificate, the issuing authority, the immediately preceding vault owner or another previous vault owner identified in a CRL) after specified criteria have been met or an event has occurred, such as the passage of a specified amount of time (e.g., two weeks, 30 days), when the entirety of the vault content has been output (as determined by, for example, when the last page of a digital book displayed or the entirety of a video or song has been played), or when vault content has been accessed a specified number of times. By enabling the automatic return of a vault to the original owner, a library issuing authority can guarantee that digital content lent out to patrons will be returned by a specified amount of time, and that the content will be available for other patrons to borrow.

In another example, vault contents can comprise information indicating a currency note. Currency note content can include a fixed value of the note, the governmental authority that issued the note, as well as additional information such as a currency note serial number. A rights module for a vault containing a currency note can comprise a possession authentication certificate. That is, the vault owner mapped to the possession authentication certificate can tender the currency note by transferring the vault to another entity (e.g., a merchant, another person). In some embodiments, the rights module does not include a possession certificate, and any user in possession or in control of the computing device at which the vault containing the currency note is stored could use the currency note.

In another example, vault contents can comprise information indicating a receipt recording, the purchase or goods or services, or payment of a bill. A vault containing a receipt could be issued by, for example, a retailer, utility or any other entity from which goods or services have been purchased or for which a bill has been paid. A rights module for such a vault can comprise an ownership authentication certificate mapped to the purchaser or the person who paid a bill. An access authentication certificate can be contained in the rights module that allows an agent of a purchaser to be the vault owner. Rights associated with an ownership authentication certificate for a receipt can include proof of purchase for goods or services, which can allow the purchaser to return a purchased item, obtain customer service or support, obtain warranty coverage and the like.

In another example, vault contents can comprise information indicating a transferable ticket, such as a ticket to a concert or sporting event. The issuing authority issuing a vault containing a transferable ticket could be, for example a sporting club, artist or concert venue. A rights module for such a vault can comprise a usage authentication certificate associated with a delegable possession right. Rights associated with a usage authentication certificate for a transferrable ticket include the right to attend a concert or sporting event, permit entry to an amusement park and the like. The rights module can comprise delegation controls for the usage authentication certification that allow the transferable ticket to be transferred a specific numbers of times, or to only specific people. Such a configuration could provide a ticket purchaser with the comfort that a person to whom the purchaser gave or sold a transferable ticket would use the ticket and not transfer the ticket to someone else or sell the ticket to a ticket scalper.

In some embodiments, the ticket represented by vault content can be a non-transferable ticket. The vault content in this case can contain identifying information of the purchaser (e.g., name, social security number, a picture of the purchaser), in which case the possession authentication certificate is associated with a non-delegable right. Although the rights associated with a non-transferable ticket are non-delegable, the vault containing a non-transferable ticket (and any other vault comprising a rights module comprising an authentication certificate associated with a non-delegable right) may still be transferred between computing devices associated with the vault owner.

In some embodiments, a vault can comprise a bill of lading. The corresponding issuing authority can be a shipping entity that provided the goods associated with the bill of lading. A rights authentication certificate can be mapped to the entity (e.g., a shipping line, trucking line) currently in possession of the goods. The rights module can comprise a Certificate of Revocation List that records the chain of custody as the goods are transferred from one entity to another in a supply chain.

In some embodiments, a vault can comprise content indicating property ownership, such as image data of a property deed. The corresponding issuing authority can be, for example, a government authority, such as a government office responsible for registering or recording property deeds. The rights module of such a vault can comprise an ownership authentication certificate mapped to the owner of the property and a possession authentication certificate mapped to a vault owner in possession of the vault, such as a property owner's agent. The possession authentication certificate can be associated with a delegable possession right and the ownership certification can be associated with a non-delegable ownership right (or a delegable ownership certification if the property is transferable to a subsequent purchaser of the property, and a new vault is not issued by the issuing authority upon property transfer).

In some embodiments, a vault can comprise content indicating an agreement, such as image data of a contract signed by two or more parties. A number of vaults can be generated by the issuing authority (e.g., a law firm, a company, any party to the contract), with each vault representing an "original" copy of the contract and distributed to the parties to the contract. The rights module in such vault can comprise a party authentication certificate mapped to a party to the contract and an access authentication certification. The rights associated with a party authentication certificate are those provided by the contract. A party authentication certificate may be delegable or non-delegable, depending on the contract terms, for example, if the contract allows certain rights to be transferred to other parties. Depending on the type of contact, the rights module can comprise additional authentication certificates such as assignor and assignee certificates, sublessor and sublessee certificates and the like.

The portable digital vaults described herein can comprise content and contain authentication certifications associated with rights other than those described in the examples above.

Example 4

Exemplary Method of Distributing a Portable Digital Vault

Figure 2:
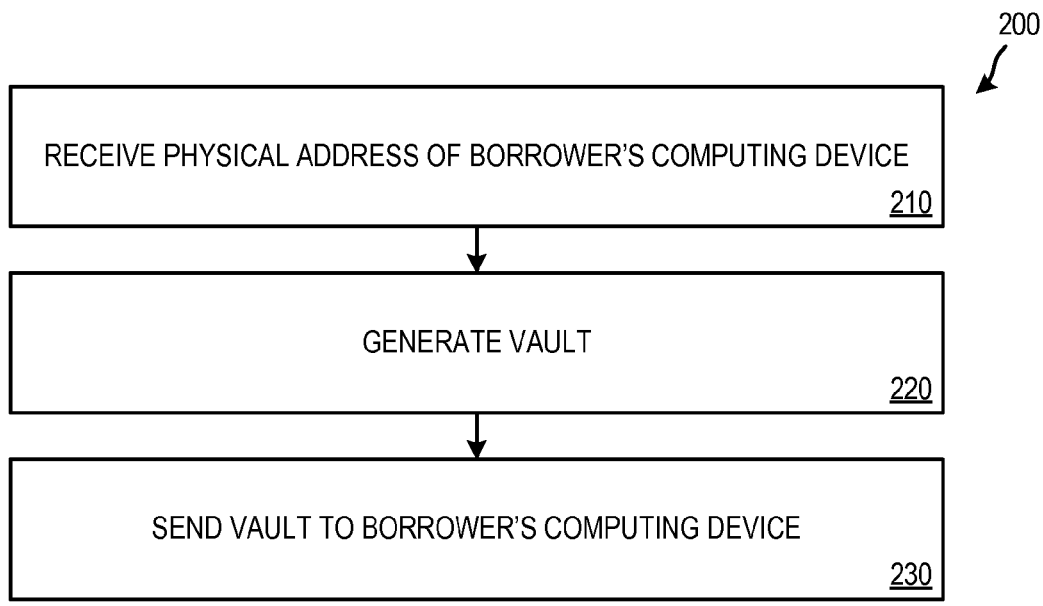
FIG. 2 is a flow chart of an exemplary method for distributing a portable digital vault.

FIG. 2 is a flow chart of an exemplary method 200 for distributing a portable digital vault. The method 200 can be performed by, for example, a library that has received a request from a patron for a particular e-book.

At 210, the issuing authority receives a computing device identifier from the borrower's computing device. The computing device identifier can be a physical address of the borrower's computing device, such as a hashed version of a MAC address.

At 220, the issuing authority generates the vault. Vault generation can comprise encrypting the requested digital content using the public key associated with the borrower and generation of one or more of the vault modules shown in FIG. 1. Generation can further include generation of the VID, vault certificate, and one or more authentication certificates.

At 230, the generated vault is transferred from the issuing authority to the borrower's computing device. Transmission of the vault can occur over a secure connection, such as over an encrypted SSL (Secure Sockets Layer) or TLS (Transport Layer Security) connection.

The exemplary method 200 can comprise more or fewer acts than shown in FIG. 2. For example, the method 200 can further comprise receipt of a request from the requesting computing device for a particular digital content, and the issuing authority requesting an address, such as a physical address (e.g., a MAC address) from a computing device requesting digital content provided by the issuing authority.

Example 5

Exemplary Vault Installation, Access and Copy Prevention

After a vault has been received at a computing device, the vault is installed at the computing device. In some embodiments, before the vault can be accessed, the vault certificate is certified to ensure that the vault was provided by the issuing authority indicated in the vault certificate and any validity conditions specified in the vault certificate are satisfied. For example, if a validity test condition specifies that a vault is to be stored on a computing device with a particular physical address, the vault will check whether the physical address of the computing device upon which the vault is stored matches the address specified in the validity test condition. In some embodiments, the vault can be password protected and a user is required to enter the proper password before being granted vault access.

If the vault content has been encrypted with a public key associated with the vault owner, the associated private key of the vault owner is used to decrypt the content before the vault contents can be output at the device. Thus, if the vault owner has kept the private key private, only the vault owner will be able to view the vault contents.

In some embodiments, to prevent the vault or its contents from being copied, the management module is configured to detect operating system commands that would result in the copying of any portion of the vault or vault contents. For instance, the management module of a vault can be executing in the background of a computing device for monitoring operation system commands.

Example 6

Exemplary Validity Conditions

In any of the examples herein, a vault can have one or more validity test conditions that must be satisfied before a vault or its contents can be accessed. These validity test conditions can be contained in the vault certificate. The validity test conditions can specify, for example, a computing device identifier, time constraints or geographic constraints that place limits on which computing devices a vault can be accessed, when and where a vault can be accessed, etc. A time constraint can specify, for example, a time and/or date range during which vault content can be accessed. Other validity test conditions can specify that no other copies of the vault or vault contents exist on the computing device on which the vault resides or other computing devices other than copies allowed by the transfer module 170. Any copies unauthorized by the transfer module 170 can be invalidated or deleted.

Example 7

Example Viewing of Vault Contents

Vault contents can be accessed and presented at an output of a computing device for a user to view or listen to. A vault can be configured such that vault contents are stored in secure memory. In some embodiments, the entire vault (including the vault modules) is stored in secure memory and/or storage, along with the vault contents. A management module 110 of a vault can exercise exclusive control over the secure memory and/or storage. In some implementations, a standard or modified operating system supports storing the vault in secure memory. In other implementations, a separate partition (e.g., disk partition) can be used as secure storage.

Upon invoking a vault's rendering program, the contents are decrypted using the private key of the vault user that corresponds to the vault owner's public key used by the issuing authority to encrypt the digital content. The vault contents are then output at a display, speaker and/or additional outputs of a computing device. As described above, the rendering module 140 can comprise software configured to output vault contents, or the rendering module 140 can provide a secure interface to software external to the vault, such as an external software application or operating system component that is capable of outputting content to a computing device output. In embodiments where the rendering program provides a secure interface, the interface can provide decrypted vault contents to the external software.

As part of displaying vault content at a device output, decrypted vault content can be read from secure memory into cache memory. In order to prevent unencrypted vault content from remaining in cache memory after being output, vault contents can be re-encrypted and written back to secure memory after being output. After a portion of the vault contents have been decrypted, read from secure memory, output, re-encrypted and written back to secure memory, this process can be performed on the next portion of vault contents to be output.

Example 8

Exemplary Transfer of Contents Between Vaults

Figure 3:
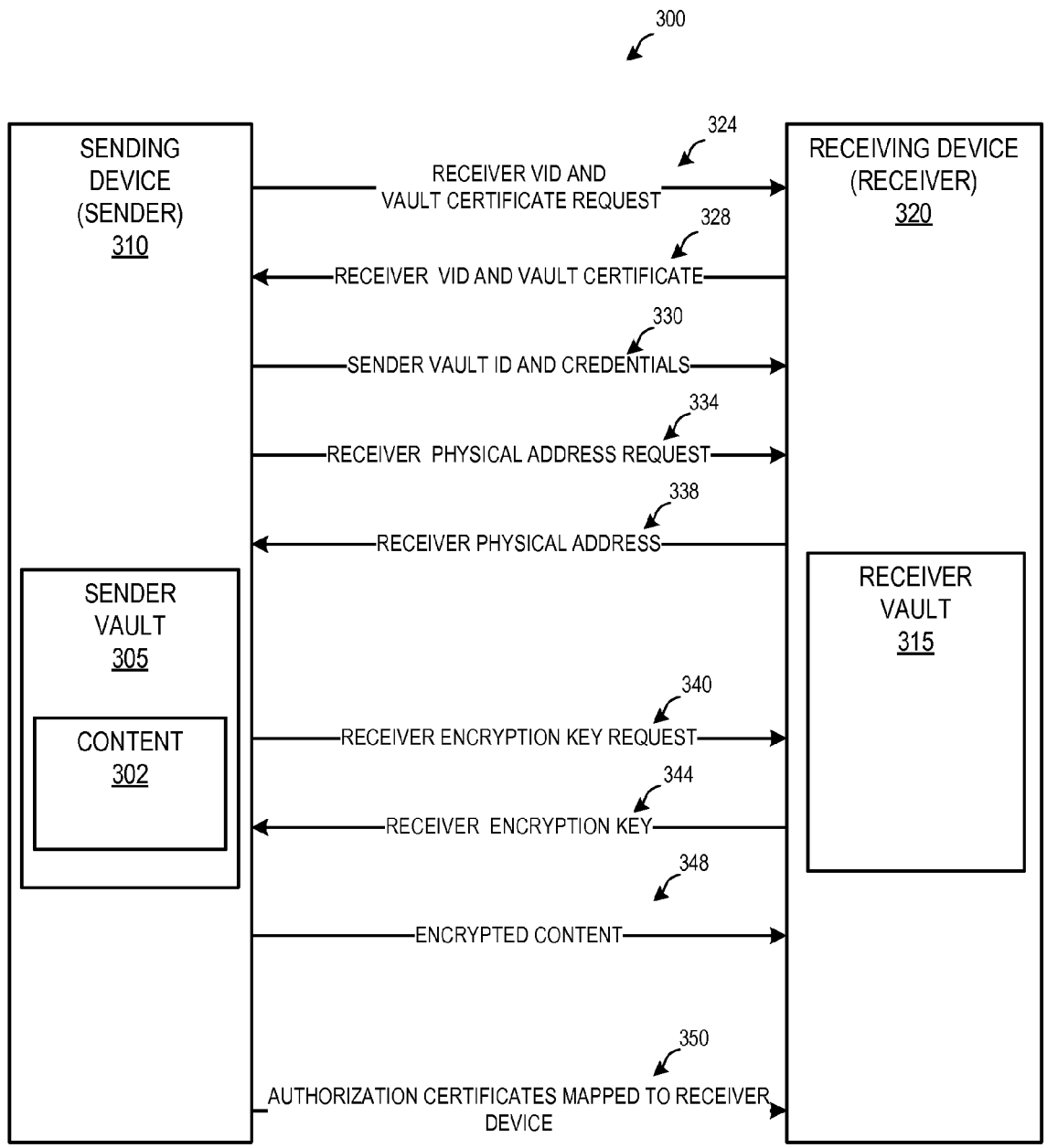
FIG. 3 is a diagram of an exemplary flow of information to enable the transfer of content between portable digital vaults.

FIG. 3 is a diagram of an exemplary flow of information 300 enabling the transfer of content 302 from a vault (sender vault 305) located at a sending computing device (sender 310) to a vault (receiver vault 315) located at a receiving computing device (receiver 320).

In an initial transfer phase, the sender 310 and receiver 320 establish a secure connection and certificates are verified. The sender 310 sends a request 324 for the VID and vault certificate of the receiver vault 315, and any other information or credentials needed to establish a secure connection. The receiver 320 responds by sending the receiver vault's VID and vault certificate, and any other needed receiver information or credentials.

Upon receipt of the receiver VID and vault certificate, the sender 310 verifies the receiver's credentials and the sender 310 sends its credentials and the vault certificate of the sender vault 305 to the receiver 320 in a communication 330. The receiver 320 verifies the vault certificate of the sender vault 305 and the sender's credentials.

The sender 310 requests the physical address of the receiver 320 in a communication 334, and the receiver 320 sends its physical address in a response 338.

After the initial phase, the sender vault has verified that the receiver vault 315 is an authorized vault, and a secure connection between the sender 310 and receiver 320 has been established.

In a middle phase, the content 302 is transferred from the sender vault 305 to the receiver vault 315. The transfer module of the sender vault 305 can be activated upon receipt of the receiver's physical address. At the receiver 320, the receiver 320 activates the key generation module of the receiver vault 315 to generate a key to be used for encrypting the content 302. In some embodiments, the key is a public key associated with the owner of the receiver vault 315. In some embodiments, the key generation module can generate a one-time pad public key for encrypting the content.

The sender 310 sends a request 340 for an encryption key and receives a receiver encryption key 344 in response. Upon receipt of the encryption key, the sender 310 decrypts the content 302 with the private key associated with public key used to encrypt the content 302, and then encrypts the content 302 with the receiver's encryption key. If the private key used for decrypting the content and the receiver encryption key are commutative, the sender 310 can encrypt the content 302 with the receiver encryption key prior to decrypting the content with the private key. Once the content 302 has been encrypted, the sender 310 sends the encrypted content to the receiver 320 (348). Once the transfer of vault contents is complete, the transferred vault contents are deleted from the sender vault 305. Thus, transfer of the vault content from the sender 310 to the receiver 320 does not result in the generation of a copy of the transferred content.

In a final phase, after transfer of the content 302 is complete, appropriate authorization certificates of the sender vault 305 are revoked. For example, if the content 302 is a digital book, and the content transfer is associated with the owner of the sender vault 305 lending the digital book to the owner of the receiver vault 315, an access authorization certificate in the rights module of the sender vault 305 allowing the sender vault owner to view the digital book can be revoked.

At the sender 310, the proper authorization certificates are mapped to the receiver device 320. The authorization certificates sent to the receiver are based in part of what rights are delegable by the sender, and which delegable rights the vault owner has elected to delegate to the subsequent vault owner (i.e., a user associated with the receiver device 320). The sender 310 sends the proper authorization certificates to the receiver 320 via a communication 350. These receiver authorization certificates are mapped to the receiver's physical address (or a hashed version thereof).

Example 9

Exemplary Closing of a Vault

In any of the examples described herein, a vault can be closed by the management module shutting down vault modules that are still executing. In some embodiments, as part of closing a vault, a management module can search for copies of a vault or vault contents on the computing device and delete these copies.

Example 10

First Exemplary Method of Transferring Content Between Portable Digital Vaults

Figure 4:
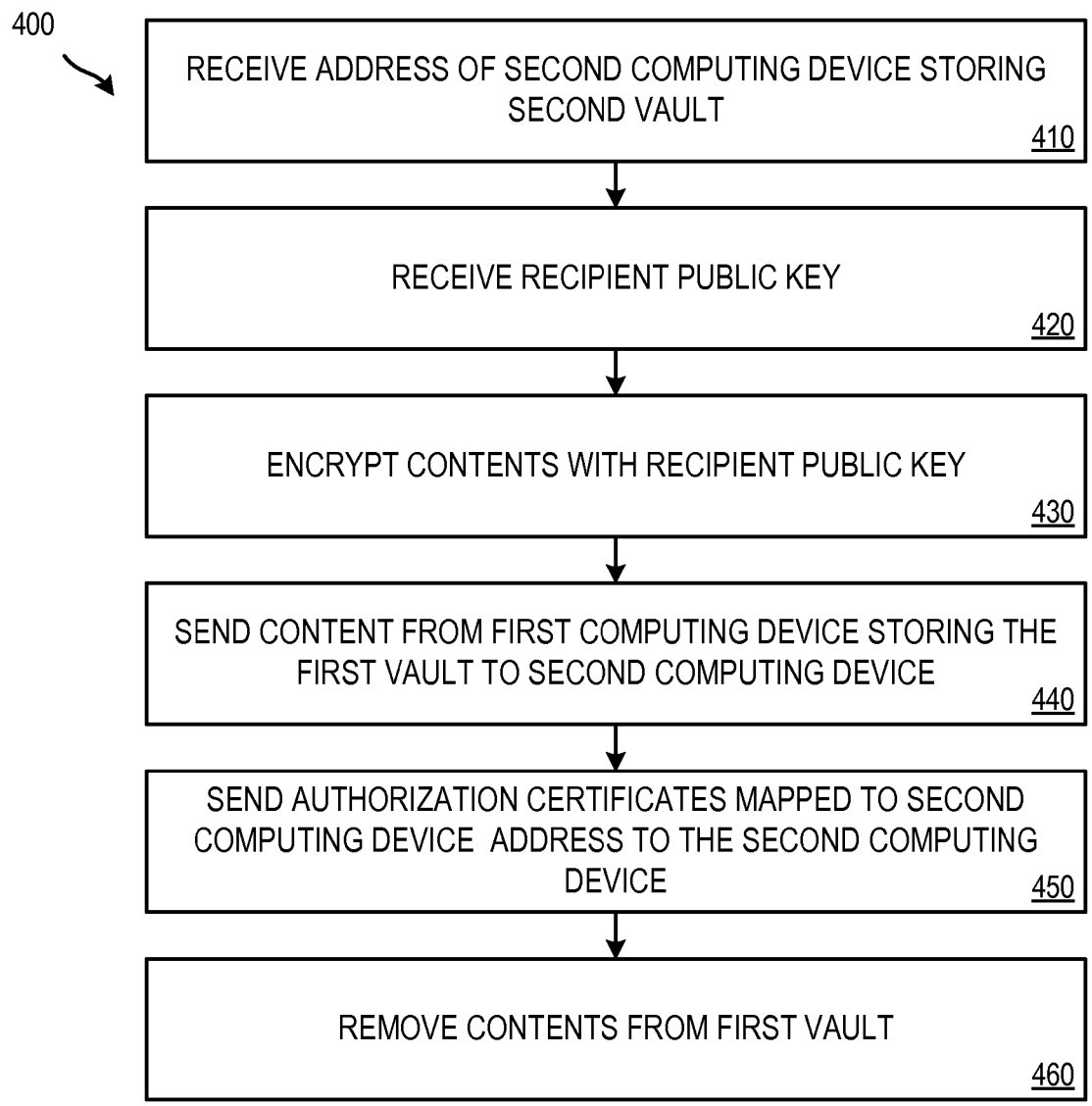
FIG. 4 is a flow chart of a first exemplary method of transferring content from a first portable digital vault to a second portable digital vault.

FIG. 4 is a flowchart of a first exemplary method 400 of transferring content from a first portable digital vault to a second portable digital vault. The method 400 can be performed, for example, by an e-book reader operated by a first user, Victoria, who wishes to loan out a copy of a digital book stored in a portable digital vault on her e-book reader to a vault located on a tablet computer operated by a second user, Ben.

At 410, an address of a second computing device storing the second portable digital vault is received. In the example, Victoria's e-book reader receives a hash of a MAC address of Ben's tablet computer. At 420, a recipient public key is received. In the example, the e-book reader receives a public key associated with Ben. At 430, the vault contents are encrypted with the recipient's public key. In the example, the e-book reader encrypts the digital book with Ben's public key.

At 440, the content is sent from a first computing device storing the first portable digital vault to the second computing device. In the example, the encrypted version of the digital book is sent from Victoria's e-book reader to Ben's tablet computer. At 450, one or more authorization certificates mapped to the address of the second computing device is sent to the second computing device. In the example, the e-book reader sends an access authorization certificate mapped to the tablet computer's MAC address to the tablet computer. At 460, the contents are removed from the first portable digital vault. In the example, the digital book is deleted from the first portable digital vault.

In some embodiments, the exemplary method 400 can comprise additional acts. For example, the exemplary method 400 can comprise receiving a vault certificate of the second portable digital vault, and, based on the vault certificate, certifying that the second portable digital vault was issued by an issuing authority that also issued the first portable digital vault. If the certification fails, the content is not sent from the first computing device to the second computing device. In the example, Victoria's e-book reader receives a vault certificate of the vault located on Ben's tablet computer and certifies that Ben's vault was issued by the same authority that issued the portable digital vault stored on Victoria's e-book reader. The issuing authority could be an online e-book retailer that issued the vaults stored on Victoria's e-book reader and Ben's tablet computer. In various embodiments of the exemplary method 400, the vault certificate can comprise one or more validity test conditions, and the method can further comprise determining that the one or more validity test conditions are satisfied; wherein the content is not sent from the first computing device to the second computing device if the certification fails. In the example, the vault certificate of the vault on Ben's tablet computer can comprise a validity test condition that requires Ben's tablet computer to have a specified computing device identifier and Victoria's e-book reader can verify that the computing device identifier of Ben's tablet computer matches that specified in the validity test condition. If not, Victoria's e-book reader will not transfer the e-book to Ben's tablet computer.

Example 11

Second Exemplary Method of Transferring Content Between Portable Digital Vaults

Figure 5:
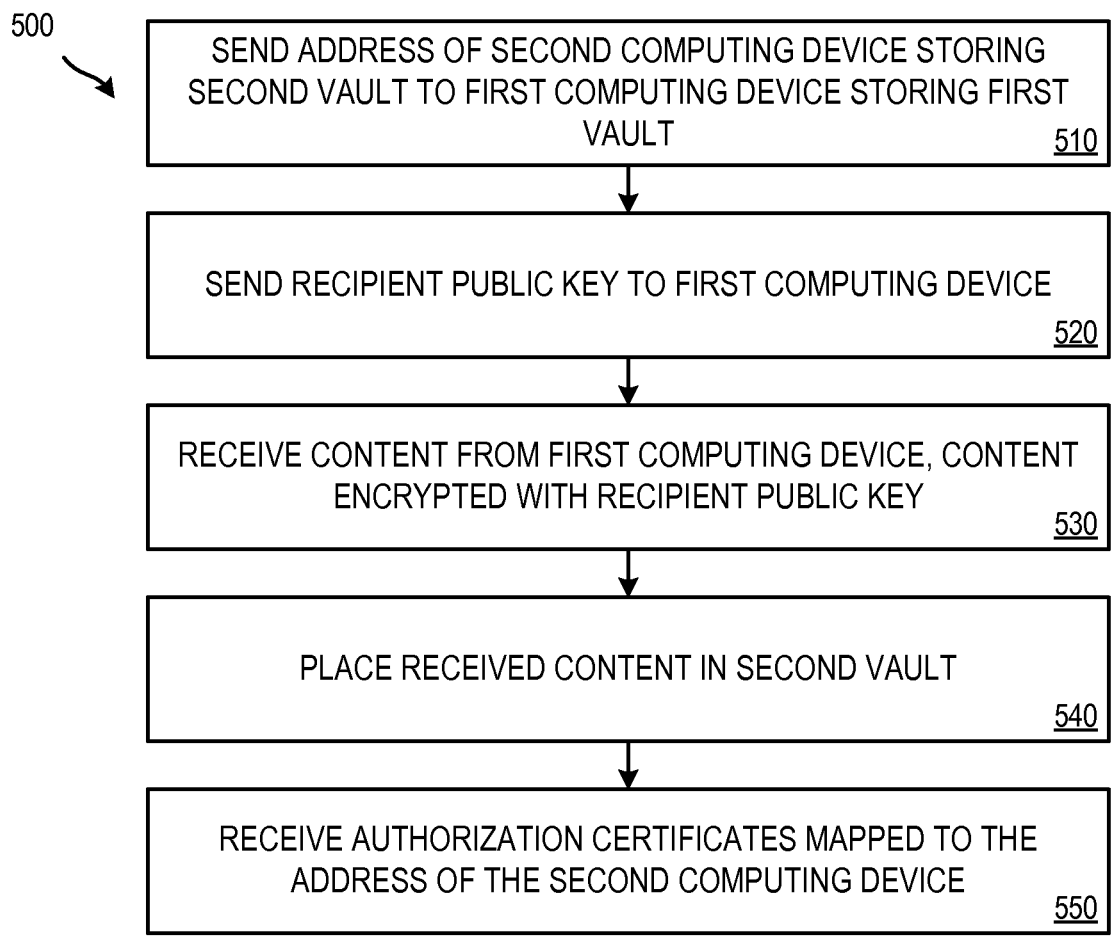
FIG. 5 is a flow chart of a second exemplary method of transferring content from a first portable digital vault to a second portable digital vault.

FIG. 5 is a flowchart of a second exemplary method 500 of transferring content from a first portable digital vault to a second portable digital vault. Continuing with the example above, the method 500 can be performed by Ben's tablet computer that receives a digital book being transferred to Ben from Victoria.

At 510, an address of a second computing device storing the second portable digital vault is sent to a first computing device storing the first portable digital vault. In the example, the hash of a physical address of Ben's tablet computer is sent to Victoria's e-book reader. At 520, a recipient public key is sent to the first computing device. In the example, a public key associated with Ben is sent to Victoria's e-book reader. At 530, content from the first computing device is received. The content is encrypted with the recipient public key. In the example, Ben's tablet computer receives the digital book encrypted with Ben's public key.

At 540, the received content is placed in the second portable digital vault. In the example, Ben's tablet computer places the encrypted digital book in the second portable digital vault stored in Ben's tablet computer. At 550, one or more authorization certificates mapped to the address of the second computing device are received. In the example, the tablet computer receives an access authorization certificate from Victoria's e-book reader authorizing Ben to access the digital book.

Example 12

Exemplary Vault Transfer

A vault can be transferred from a sending computing device to a receiving computing device as follows. A transfer module of the vault requests a computing device of the receiving device. The receiving device receives the request and sending a receiving computing device identifier to the sending device. A key management module of the vault generates a key based on the sending computing device identifier and encrypts the contents of the vault using the key. The sending computing device then sends a copy of the portable digital vault to the receiving device. The vault can be sent to the receiving device via an encrypted SSL or TLS connection. The copy of the vault at the receiving device determines whether the validity test conditions stored in the identity module are satisfied. If so, then the vault allows the contents of the vault to be accessed at the receiving computing device.

If the vault transfer was part of a vault copy operation, wherein a copy of the vault remains at the sending computing device, the copy of the vault at the sending computing device can revoke authorization certificates that allow vault operations to be performed on the copy of the vault at the sending computing device. If the vault transfer was part of a vault "move" operation, the copy of the vault at the sending computing device is deleted after the copy of the vault has been sent to the receiving computing device.

In a first exemplary method of transferring a portable digital vault from a sending computing device to a receiving computing device, the method comprises: requesting a receiving computing device identifier; generating an encryption key based on the receiving computing device identifier; binding the vault to the receiving device identifier, the binding comprising encrypting contents of the vault with the encryption key; and sending the vault to the receiving computer device. In some embodiments, the first exemplary method can further comprise revoking an authorization certificate of the portable digital vault allowing the sending computing device to access the portable digital vault. In other embodiments, the first exemplary method can further comprise deleting the vault from the sending computing device.

Example 13

Exemplary Contract Execution Using Vaults

The vaults described herein can be used by parties wishing to enter into an agreement. In one embodiment, a vault can be used for executing a contract as follows. An authority issues a portable digital vault comprising a contract to be signed by the parties to the contract. The vault can comprise information indicating which party is to sign which signature field and authentication certificates that allow each party to digitally sign their name to the contract. For example, a vault can comprise "write" authentication certificates for each party to the contract that allows individual parties to digitally sign their name to particular signature fields in the document.

Vault certificate validity test conditions can be used to ensure the identity of the contract parties. Validity test conditions can comprise a computing device identifier that a party is to use to sign the contract and/or a user identifier, such as a user id and password, or key that is associated with the user.

The contract can be signed by the vault being transferred from one party to another. The vault can be distributed to a first party to the contract, and once the first party has digitally signed the contract, the contract can be sent to another party to the contract. The authentication certificates can be "one-time write" certificates such that after a party signs the contract, the authentication certificate is modified such that the party that just signed the document no longer has write access to the contract, but does have read access.

After one party has signed the contract, the vault can be capable of automatically forwarding the contract to another party to the contract. After the contract has been signed by all parties to the contract, the vault can be considered to be an original contract. The issuing authority can distribute additional copies of the contract that are executed by all parties to create additional originals of the contract.

If the contract pertains to ownership or transfer of a property (e.g., a real estate purchase contract, a title deed), upon sale of the property, the proper issuing authority can generate the vaults necessary to execute subsequent transfers of the property. For example, a county's recorder of deeds or registrar of titles can be an issuing authority that generates and distributes portable digital vaults that can be used to execute the transfer of real or personal property.

In one exemplary method of signing a contract using a portable digital vault, the method comprises: at a receiving computing device, receiving a portable digital vault comprising the contract, the contract comprising signature fields for parties to the contract, the portable digital vault capable of allowing individual parties to the contract to sign the contract only once, the portable digital vault further comprising validity test conditions that identity parties to the contract by at least a user identifier and a computing device identifier; providing a user identifier for a first user and a receiving computing device identifier of the receiving computing device to the portable digital vault; determining that the user identifier for the first user and the receiving computing device identifier satisfy one of validity test conditions; and receiving a user signature at one of the signature fields in the contract.

Example 14

Exemplary Features

One or more of the following features of the technology can be applied separately or in combination with any other features described herein.

Example feature 1: a method of transferring contents of a first portable digital vault to a second portable digital vault is provided, the method comprising sending to a first computing device storing the first portable digital vault, an address of a second computing device storing the second portable digital vault, sending a recipient public key to the first computing device, receiving content from the first computing device, the content encrypted with the recipient public key, placing the received content in the second portable digital vault, receiving one or more authorization certificates mapped to the address of the second computing device.

The method of the example feature 1 further comprising a key module of the second portable digital vault generating the recipient public key.

The method of example feature 1 wherein one of the one or more authentication certificates comprises a validity test condition indicating a time constraint.

The method example feature 1, further comprising the second portable digital vault transferring the content back to the first portable digital vault when the time constraint is no longer satisfied.

Example feature 2: a method of transferring a portable digital vault from a sending computing device to a receiving computing device, the method comprising requesting a receiving computing device identifier, generating an encryption key based on the receiving computing device identifier, binding the portable digital vault to the receiving computing device identifier, the binding comprising encrypting contents of the portable digital vault with the encryption key, and sending the portable digital vault to the receiving computing device.

The method example feature 2, further comprising revoking an authorization certificate of the portable digital vault allowing the sending computing device to access the portable digital vault.

The method example feature 2, further comprising deleting the portable digital vault from the sending computing device.

Example feature 3: a method of transferring a portable digital vault from a sending computing device to a receiving computing device, the method comprising receiving a request for a receiving computing device identifier from a sending computing device, sending the receiving computing device identifier of the receiving computing device to the sending computer device, receiving the portable digital vault from the sending computing device; the portable digital vault comprising an identity module comprising one or more validity test conditions, the contents of the portable digital vault being encrypted with a key generated from the receiving computing device identifier, and determining that the one or more validity test conditions are satisfied before allowing the portable digital vault to be accessed at the receiving computing device.

Example feature 4: a method of signing a contract using a portable digital vault, the method comprising, at a receiving computing device, receiving a portable digital vault comprising the contract, the contract comprising signature fields for parties to the contract, the portable digital vault capable of allowing the parties to the contract to sign the contract only once, the portable digital vault further comprising validity test conditions that identity the parties to the contract by at least a user identifier and a computing device identifier, providing a user identifier for a first user and a receiving computing device identifier of the receiving computing device to the portable digital vault, determining that the user identifier for the first user and the receiving computing device identifier satisfy at least one of the validity test conditions, and receiving a user signature for one of the signature fields in the contract.

The method example feature 4, wherein the parties to the contract are allowed to only sign the contract once by modifying an authentication certificate associated with a party to the contract such that the party is not allowed to write to the contract after the party has signed the contract.

Exemplary Advantages

The portable digital vault technologies disclosed herein can have at least the following advantages. The vault is a self-contained unit that does not rely on a third party, such as an issuing authority, to transfer the vault from one computing device to another (or to transfer vault contents between vaults). Further, a vault can act as an authority unto itself. A vault can issue authorization certificates allowing subsequent vault owners to access a vault, without having to consult with an issuing authority or other third party. Moreover, the disclosed vaults do not allow copies of the vault or vault contents to be made. For example, the vault can monitor and kill operating system commands that would result in copies of the vault or its contents being made. Thus, the portable digital vault can allow for the legal, fair use of copyrighted digital content that may not be allowed by certain digital rights management technologies.

A portable digital vault can also serve as a receipt or a digital legal contract, equivalent to a physical receipt or a physical (printed on paper) legal contract. Thus, portable digital vaults can act as an enabler of e-commerce.

Exemplary Computing Environment

The techniques and solutions described herein can be performed by software and/or hardware of a computing environment, such as a computing device. Exemplary computing devices include server computers, desktop computers, laptop computers, notebook computers, netbooks, tablet computers, mobile devices, smartphones and other types of computing devices.

Figure 6:
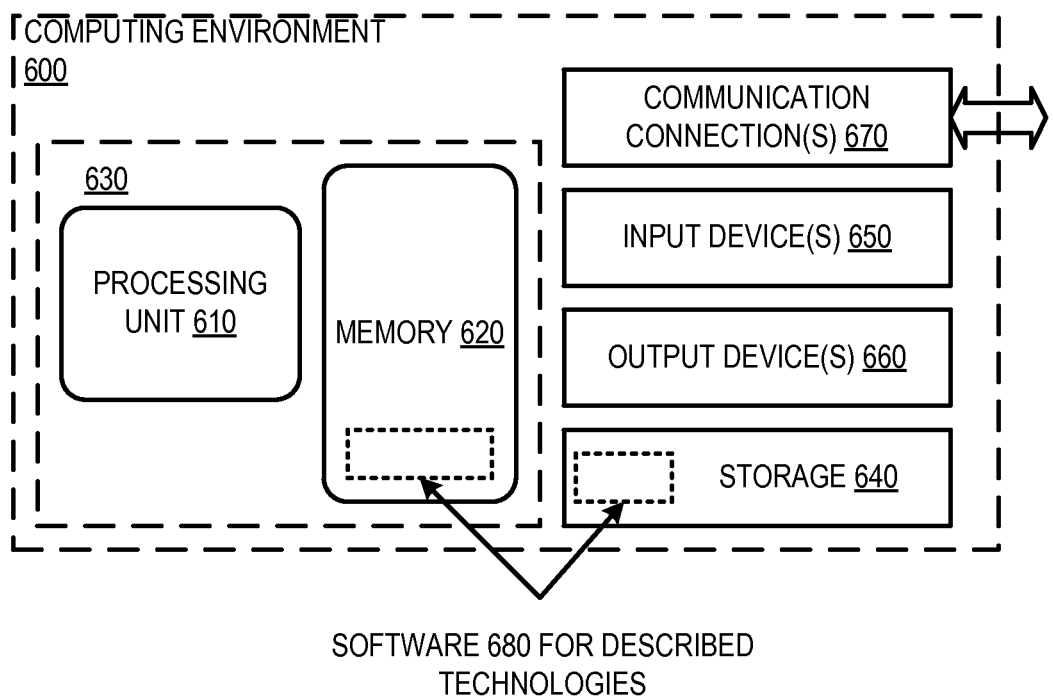
FIG. 6 illustrates a generalized example of a suitable computing environment in which described embodiments, techniques and technologies can be implemented.

FIG. 6 illustrates a generalized example of a suitable computing environment 600 in which described embodiments, techniques, and technologies can be implemented. The computing environment 600 can correspond to any of the computing devices described herein. The computing environment 600 is not intended to suggest any limitation as to scope of use or functionality of the technology, as the technology can be implemented in diverse general-purpose or special-purpose computing environments. For example, the disclosed technology can be implemented using one or more computing devices (e.g., a server, desktop, laptop, hand-held device, mobile device, smartphone), respective of the computing devices comprising a processing unit, memory and storage storing computer-executable instructions implementing the technologies described herein. The disclosed technology can also be implemented with other computer system configurations, including multiprocessor systems, microprocessor-based or programmable consumer electronics, network PCs, minicomputers, mainframe computers, a collection of client/server systems and the like. The disclosed technology can also be practiced in distributed computing environments where tasks are performed by remote processing devices that are linked through a communications network, such as the Internet. In a distributed computing environment, program modules can be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 can be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment can have additional features. For example, the computing environment 600 includes storage 640, one or more input devices 650, one or more output devices 660 and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 can be removable or non-removable, and includes magnetic disks, magnetic tapes or cassettes, CD-ROMs, CD-RWs, DVDs, or any other tangible storage medium which can be used to store information and which can be accessed within the computing environment 600. The storage 640 stores instructions for the software 680, which can implement technologies described herein.

The input device(s) 650 can be a touch input device, such as a keyboard, keypad, mouse, touchscreen, pen, or trackball, a voice input device, a scanning device, or another device, that provides input to the computing environment 600. For audio, the input device(s) 650 can be a sound card or similar device that accepts audio input in analog or digital form, or a CD-ROM reader that provides audio samples to the computing environment 600. The output device(s) 660 can be a display, printer, speaker, CD-writer or another device that provides output from the computing environment 600.

The communication connection(s) 670 enable communication over a communication medium (e.g., a connecting network) to other computing entities. The communication medium conveys information such as computer-executable instructions, compressed graphics information or other data in a modulated data signal.

The computing environment 600 can comprise web-based services. For example, portable digital vaults can be provided by a web-based issuing authority, such as an on-line retailer, a government agency, or the on-line presence of a local library.

Exemplary Cloud Computing Environment

Figure 7:
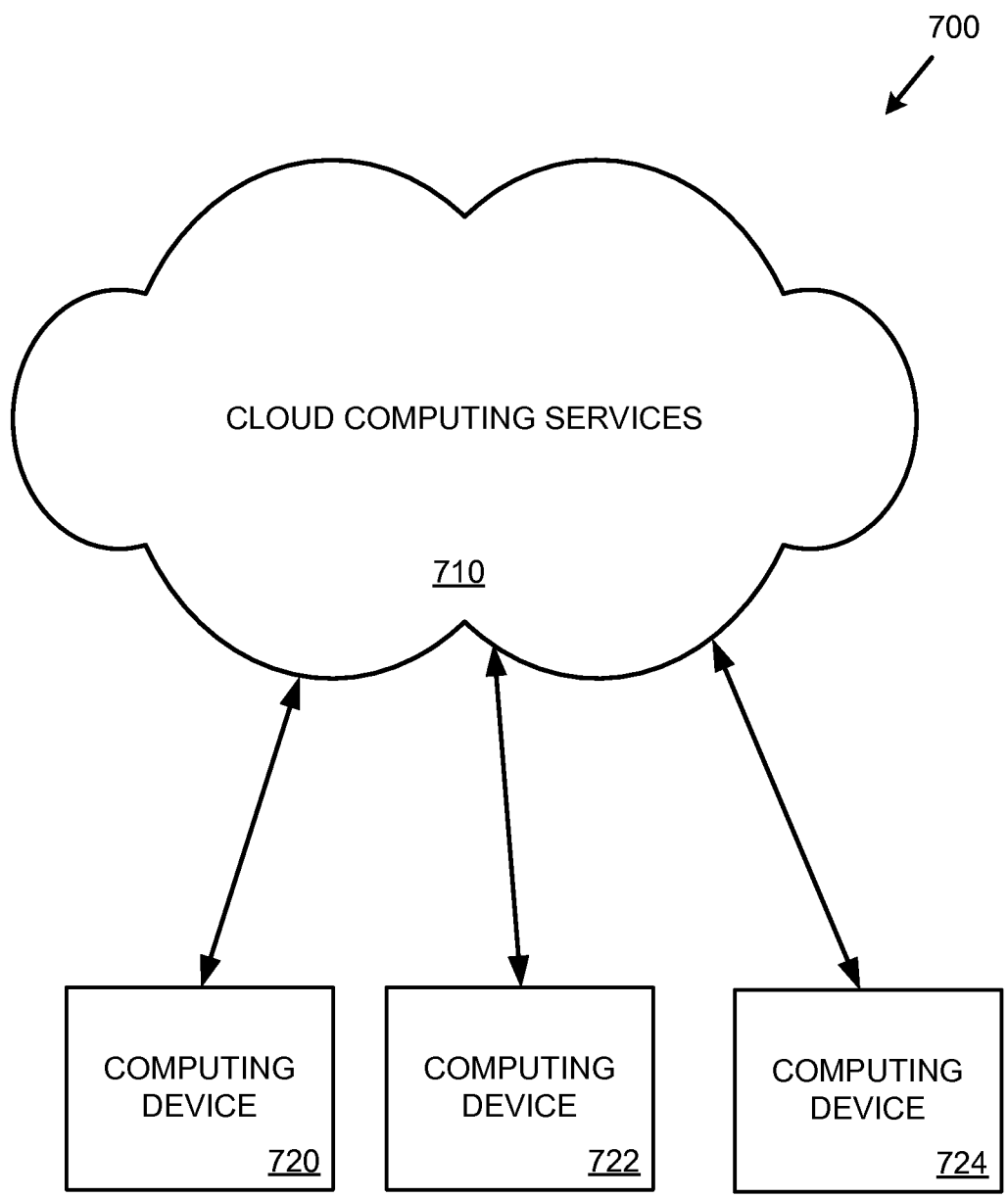
FIG. 7 illustrates a generalized example of a suitable cloud computing environment in which described embodiments, techniques, and technologies can be implemented.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries)

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like.

Methods in Computer-Readable Media

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smartphones or other computing devices that include computing hardware). By way of example and with reference to FIG. 6, computer-readable storage media include memory 620 and storage 640. Computer-readable storage media does not include propagated signals, such as the communication connection(s) 670 depicted in FIG. 6. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

Any of the methods described herein can be implemented by computer-executable instructions stored in one or more computer-readable storage devices (e.g., hard disk drives, floppy disk drives, memory integrated circuits, memory modules, solid-state drives and other devices comprising computer-readable storage media). Such instructions can cause a computer to perform the method.

Definitions

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Alternatives

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation. In view of the many possible embodiments to which the principles of the illustrated embodiments may be applied, it should be recognized that the illustrated embodiments are only examples and should not be taken as limiting the scope of the disclosure.

I claim all that comes within the scope of the appended claims.

I claim:

1. One or more computer-readable storage media storing a portable digital vault comprising instructions executable by a computing device, the portable digital vault comprising:
   a contents module configured to store content that is encrypted;
   a transfer module configured to transfer the portable digital vault from a first computing device associated with a first owner of the portable digital vault to a second computing device associated with a second owner of the portable digital vault;
   a rendering module configured to output the content at a computing device in unencrypted form or to provide a secure interface to software external to the portable digital vault configured to output the content at the computing device;
   an identity module comprising a vault certificate, the vault certificate comprising a validity test condition specifying a specified computing device identifier, wherein the contents module, the transfer module and the rendering module can only be executed on a computing device associated with a computing device identifier that matches the specified computing device identifier; and
   a rights module comprising one or more authentication certificates, wherein the one or more authentication certificates comprise:
      at least one authentication certificate associated with a delegable right, wherein the delegable right is a right to transfer ownership of the content of the portable digital vault from the second owner to one or more subsequent owners of the portable digital vault.

2. The one or more computer-readable storage media of claim 1, wherein the specified computing device identifier comprises a physical address of a computing device.

3. The one or more computer-readable storage media of claim 1, wherein the portable digital vault further comprises:
   a key management module.

4. The one or more computer-readable storage media of claim 3, wherein the rights module comprises a list of the one more subsequent vault owners to whom the portable digital vault can be transferred.

5. The one or more computer-readable storage media of claim 4, wherein the rights module comprises an order in which the portable digital vault is to be transferred among the one or more subsequent vault owners.

6. A method of providing a portable digital vault, the method comprising, at an issuing authority computing device:

receiving a computing device identifier from a receiving computing device;

generating the portable digital vault, the portable digital vault comprising:

a contents module comprising content that is encrypted;

a transfer module;

a rendering module configured to output the content at the receiving computing device in unencrypted form or to provide a secure interface to software external to the portable digital vault configured to output the content at the receiving computing device;

an identity module comprising a vault certificate, the vault certificate comprising a validity test condition specifying the computing device identifier from the receiving computing device, wherein the contents module, the transfer module and the rendering module can only be executed on a computing device associated with a computing device identifier that matches the computing device identifier from the receiving computing device; and a rights module comprising one or more authentication certificates, at least one authentication certificate associated with a delegable right, wherein the delegable right is a right to transfer ownership of the content of the portable digital vault from the receiving computing device to one or more subsequent owners of the portable digital vault; and sending the portable digital vault to the receiving computing device;

wherein after the portable digital vault is sent to the receiving computing device, a copy of the portable digital vault is not stored at the issuing authority computing device.

7. The method of claim 6, wherein the sending is performed by the transfer module of the portable digital vault.

8. The method of claim 6, wherein the content comprises a currency note having a fixed value, and the issuing authority computing device is a governmental authority.

9. A method of transferring a portable digital vault from a sending computing device to a receiving computing device, the method comprising:

requesting a receiving computing device identifier;

generating an encryption key based on the receiving computing device identifier;

binding the portable digital vault to the receiving computing device identifier, the binding comprising encrypting contents of the portable digital vault with the encryption key, the portable digital vault comprising:

a contents module comprising the encrypted contents;

a transfer module;

a rendering module configured to output the contents at the receiving computing device in unencrypted form or to provide a secure interface to software external to the portable digital vault configured to output the contents at the receiving computing device;

an identity module comprising a vault certificate, the vault certificate comprising a validity test condition specifying the receiving computing device identifier, wherein the contents module, the transfer module and the rendering module can only be executed on a computing device associated with a computing device identifier that matches the receiving computing device identifier;

a rights module comprising one or more authentication certificates, at least one authentication certificate associated with a delegable right, wherein the delegable right is a right to transfer ownership of the contents of the portable digital vault from the receiving computing device to one or more subsequent owners of the portable digital vault; and sending the portable digital vault to the receiving computing device.

10. The method of claim 9, further comprising deleting the portable digital vault from the sending computing device.

11. The one or more computer-readable storage media of claim 1, wherein the one or more authentication certificates of the rights module further comprise:

at least one authentication certificate associated with a non-delegable right, wherein the non-delegable right is a right that is mapped to a single owner of the portable digital vault, and wherein the non-delegable right cannot be transferred to the one or more subsequent owners of the portable digital vault.

12. The one or more computer-readable storage media of claim 1, wherein an issuing authority of the portable digital vault configures the rights module to set the at least one authentication certificate to the delegable right in response to the content being purchased as transferrable content; and wherein the rights module supports at least one other authentication certificate associated with a non-delegable right when the content is purchased as non-transferrable content.

* * * * *